United States Patent
Tully et al.

(10) Patent No.: US 8,714,043 B2
(45) Date of Patent: May 6, 2014

(54) INTERMEDIATE GEAR DEVICE

(75) Inventors: Andreas Tully, Herzogenaurach (DE); Peter Solfrank, Frensdorf (DE); Werner Hofmann, Effeltrich (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 140 days.

(21) Appl. No.: 13/277,635

(22) Filed: Oct. 20, 2011

(65) Prior Publication Data

US 2012/0125135 A1 May 24, 2012

(30) Foreign Application Priority Data

Nov. 24, 2010 (DE) .......................... 10 2010 052 200

(51) Int. Cl.
*F16H 57/04* (2010.01)

(52) U.S. Cl.
USPC .......................................... 74/467; 184/6.12

(58) Field of Classification Search
USPC ........... 74/37, 432, 467, 570.3; 384/462, 467, 384/472, 473; 184/6.12; 123/90.34, 196 R, 123/198 R, 198 DA, 195 H, 90.27, 90.31; 464/7
See application file for complete search history.

(56) References Cited

U.S. PATENT DOCUMENTS

| | | | | | |
|---|---|---|---|---|---|
| 824,628 | A | * | 6/1906 | Curtis | 384/439 |
| 1,329,720 | A | * | 2/1920 | Meier | 384/462 |
| 1,954,685 | A | * | 4/1934 | Stanton | 384/472 |
| 2,362,667 | A | * | 11/1944 | Schmidt | 384/305 |
| 3,574,423 | A | * | 4/1971 | Thomson | 384/473 |
| 3,625,576 | A | * | 12/1971 | Miller et al. | 384/397 |
| 3,628,837 | A | * | 12/1971 | Otto | 384/462 |
| 4,103,759 | A | * | 8/1978 | Erich et al. | 184/64 |
| 4,765,760 | A | * | 8/1988 | Heshmat et al. | 384/398 |
| 4,772,136 | A | * | 9/1988 | Carter | 384/112 |
| 5,001,377 | A | * | 3/1991 | Parkinson | 310/90 |
| 5,188,576 | A | * | 2/1993 | Maguire et al. | 475/348 |
| 5,199,800 | A | * | 4/1993 | Bauer et al. | 384/473 |

(Continued)

FOREIGN PATENT DOCUMENTS

| | | |
|---|---|---|
| DE | 102005002481 | 7/2006 |
| DE | 103 43 469 A1 | 10/2011 |
| EP | 1098075 | 5/2001 |

OTHER PUBLICATIONS

"Der 6,0-1-V12-TDI Motor von Audi" (The 6.0 L V12 TDI ENgine from Audi), Automotive Enginnering Journal MTZ, Oct. 2008, pp. 798-811.

*Primary Examiner* — Troy Chambers
*Assistant Examiner* — Jake Cook
(74) *Attorney, Agent, or Firm* — Volpe and Koenig, P.C.

(57) ABSTRACT

An intermediate gear device for a traction drive and/or spur gear drive of an internal combustion engine is provided, having an intermediate gear that has an at least two-track construction with a drive gear and a driven gear, an axle, and a needle bearing by which the intermediate gear is radially mounted on the axle. At least one supporting disk is provided on which the intermediate gear is axially supported, and a duct, that is connectable to the lubricant circuit of the internal combustion engine, to supply lubricant to the needle bearing. The support disk and the axle contact one another at the end faces, the mouth of the lubricant duct that opens toward the needle bearing is formed by one or more recesses on the contact surface of the support disk and/or on the contact surface of the axle.

5 Claims, 2 Drawing Sheets

(56) References Cited

U.S. PATENT DOCUMENTS

| | | | |
|---|---|---|---|
| 6,474,444 B1 * | 11/2002 | Mochizuki | 184/6.12 |
| 2005/0061287 A1 * | 3/2005 | Takahashi et al. | 123/195 H |
| 2005/0076869 A1 | 4/2005 | Utsumi et al. | |
| 2006/0051005 A1 * | 3/2006 | Schott | 384/462 |

* cited by examiner

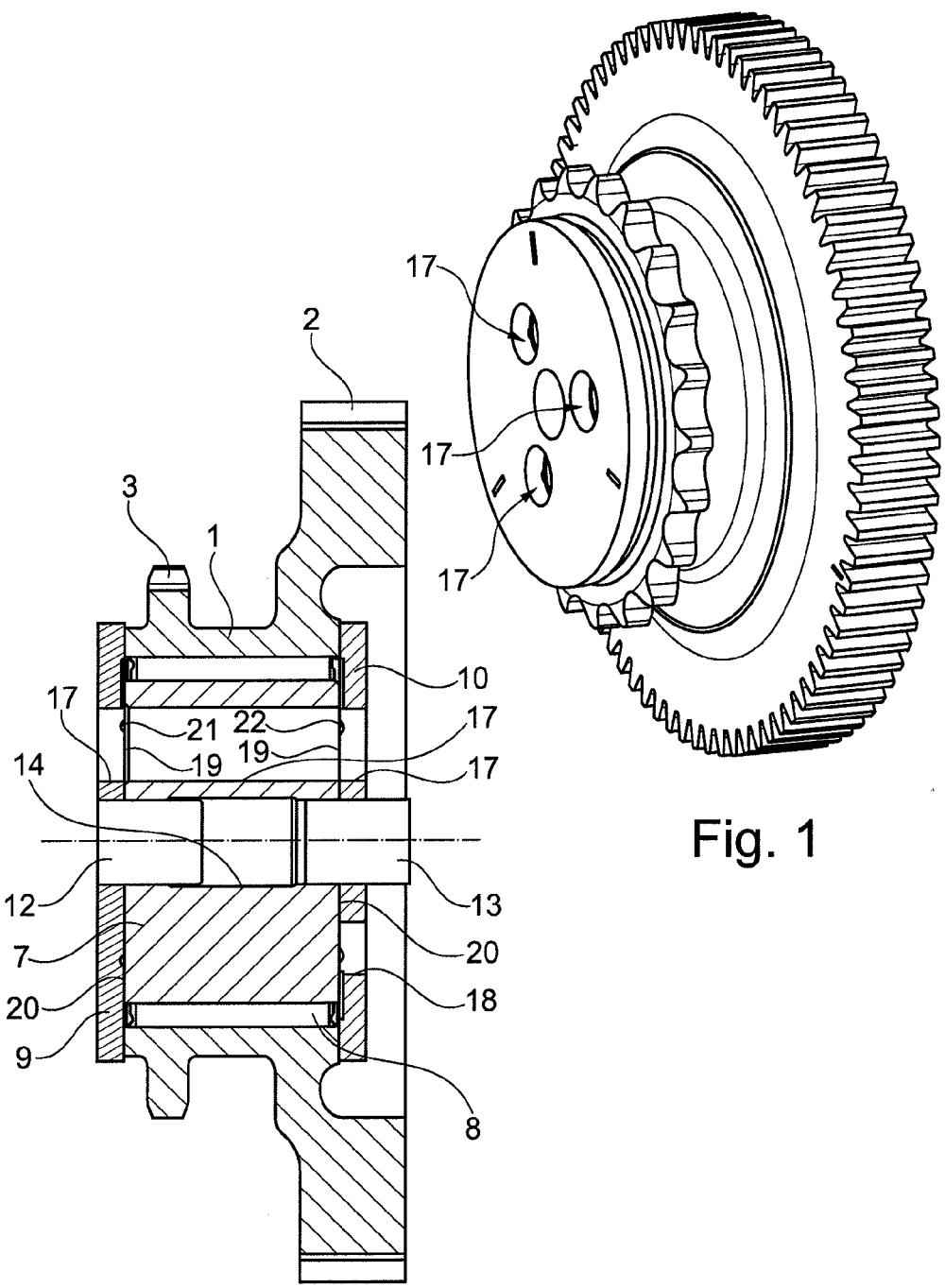

INTERMEDIATE GEAR DEVICE

CROSS-REFERENCE TO RELATED APPLICATIONS

This application claims the benefit of German Patent Application No. 102010052200.7, filed Nov. 24, 2010, which is incorporated herein by reference as if fully set forth.

BACKGROUND

The present invention relates to an intermediate gear device for a traction drive (i.e. a belt drive or chain drive) and/or spur gear drive of an internal combustion engine, having an intermediate gear that has an at least two-track construction having a drive gear and a driven gear, an axle, and a needle bearing by which the intermediate gear is radially mounted on the axle, at least one supporting disk on which the intermediate gear is axially supported, and a duct, connectable to the lubricant circuit of the internal combustion engine, for supplying lubricant to the needle bearing.

In particular, internal combustion engines in a V configuration have control assemblies in which the camshafts are not driven immediately by the crankshaft, but rather by so-called intermediate gears. These gears connect the drive at the side of the crankshaft to the driven part at the side of the camshaft, and are fashioned with a drive gear and, depending on the design of the internal combustion engine, with one or more driven gears, in a two-track or multi-track design.

For example, DE 103 43 469 A1 discloses a control assembly having two two-track intermediate gears, the drive gears and driven gears thereof being fashioned as chain gears of the chain drive that drives at the crankshaft side, or of the chain drives that are driven at the camshaft side.

The article "Der 6,0-1-V12-TDI-Motor von Audi" (The 6.0 L V12 TDI Engine from Audi) published in the automotive engineering journal MTZ, 10/2008, indicates a control assembly that uses a three-track intermediate gear to drive the two chain drives to the camshafts. The drive of the intermediate gear at the crankshaft side takes place via spur gears.

An intermediate gear device of the type noted above is disclosed in U.S. 2005/0076869 A1. The intermediate gear, which here has a two-track construction, and which in this case comprises a chain gear at the crankshaft side as drive gear and a spur gear at the camshaft side as driven gear, is radially mounted by a needle bearing on the axle fastened to the internal combustion engine, and is axially supported at both sides on support disks threaded onto the axle. In order to supply lubricant to the needle bearing, the axle is connected to the lubricant supply system of the internal combustion engine and is provided with radial transverse bores that connect the bearing raceway region of the axle to a blind bore in the axle that contains lubricant.

SUMMARY

Against this background, the present invention is based on the object of improving the construction of an intermediate gear device of the type noted above so that it can be manufactured more simply and more economically.

This objective is met in that the support disk and the axle contact one another at their end faces, and the mouth of the lubricant duct opens toward the needle bearing that is formed by one or more recesses on the contact surface of the support disk and/or on the contact surface of the axle. The omission that this enables of the radial transverse bores known from the prior art cited above, and their substitution by the recesses according to the present invention, results in a significantly reduced manufacturing expense for the lubricant duct. This is because the comparatively small and/or deep transverse bores can be manufactured only with a correspondingly high time outlay and/or tool wear, and consequently with high cost, whereas the recesses according to the present invention require a significantly lower manufacturing outlay, in particular if they are manufactured by non-cutting stamping of one or both contact surfaces that lie against one another. Here, the volume flow required for the reliable lubrication of the needle bearing can be set in a highly flexible manner via the number and shape of the recesses, and in particular can be set to a quantity that is small but nonetheless sufficient without for example being bound to a least diameter, determined by wear, of the otherwise required drilling or milling tool for producing the transverse bores.

With regard to the economical manufacturability of the axle, it can be advantageous for the axle to be made without flanges. Here, for the axial support on both sides of the intermediate gear, two support disks are provided that contact the axle at the end face. Due to its lack of flanges, the axle can be machined using centerless grinding, and in particular its bearing raceway can be ground using the through-feed method. Alternatively, however, a flange formed at one side on the axle can be provided for the axial supporting of the intermediate gear.

In the case of the flange-free axle having two support disks, the supply of lubricant to the needle bearing can take place axially at both sides, i.e. from both support disks, and can take place essentially symmetrically, i.e. with approximately equally large volume flows to and into both sides of the needle bearing.

The geometrical shaping of the recesses can take place in a wide variety of ways. As will be illustrated in relation to an exemplary embodiment of the present invention described below, a preferred possibility is that the recesses comprise an annular duct that communicates hydraulically with at least one axial opening, which contains lubricant, through the support disk and/or through the axle, as well as ribs that branch radially outward from the annular duct, distributed circumferentially. The axial opening through the axle can be a screw bore for the screw fastening of the intermediate gear device to the internal combustion engine.

BRIEF DESCRIPTION OF THE DRAWINGS

Further features of the present invention result from the following description and from the drawings, which show an exemplary embodiment of an intermediate gear device according to the present invention for a control assembly of an internal combustion engine. In part, identical or functionally identical features or components have been provided with identical reference characters.

FIG. 1 shows the intermediate gear device in a perspective assembled representation;

FIG. 2 shows the intermediate gear device in longitudinal section;

DETAILED DESCRIPTION OF THE PREFERRED EMBODIMENTS

Figure 3:
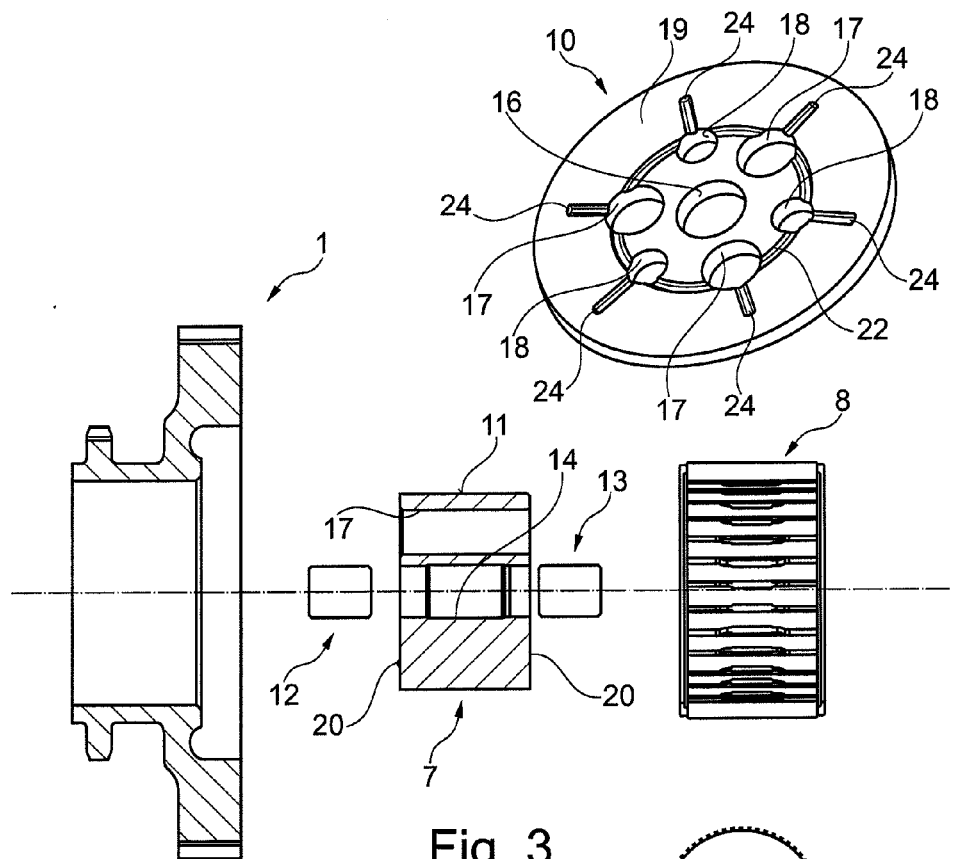
FIG. 3 is an exploded view of the intermediate gear device.
Figure 4:
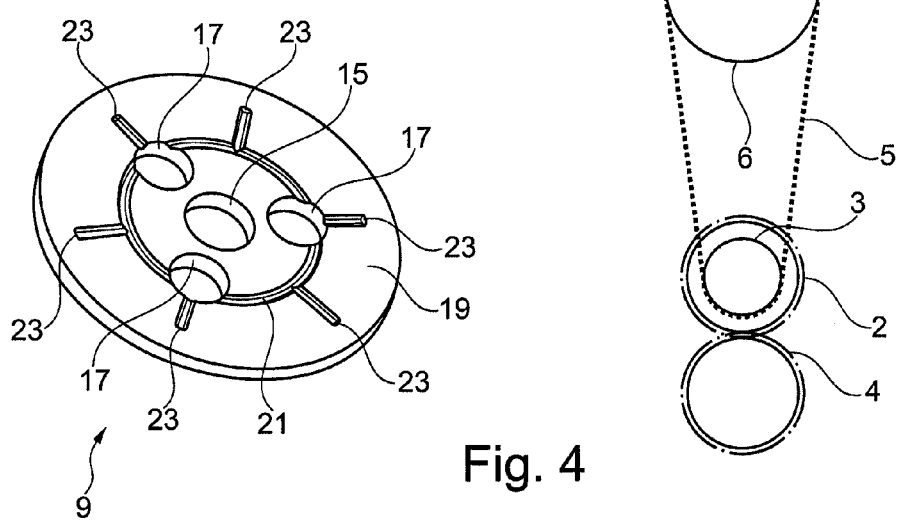
FIG. 4 shows the control assembly in a schematic representation.

FIGS. 1 through 3 show an intermediate gear device according to the present invention having an intermediate gear 1 that is fashioned with a two-track construction, having a drive gear in the form of a straight-cut spur gear 2 and a driven gear in the form of a chain gear 3. The intermediate gear device forms a part of the control assembly, shown schematically and in highly simplified fashion in FIG. 4, of an internal combustion engine, spur gear 2 meshing with a crankshaft spur gear 4, and chain gear 3 driving a camshaft chain gear 6 via a chain 5.

In addition to intermediate gear 1, the intermediate gear device comprises an axle 7 and a needle bearing 8 with a needle cage that is used for the radial anti-friction mounting of intermediate gear 1 on axle 7, as well as two support disks 9 and 10 that contact axle 7 at the end face, on which disks intermediate gear 1 and the cage of needle cage 8 are axially supported at both sides. Due to the fact that support disks 9, 10 each form an axial bearing, axle 7 is realized without flanges and has an unstepped outer diameter 11 that is ground with the required raceway surface quality in a centerless through-feed process.

In the state in which it is not assembled to the internal combustion engine, the intermediate gear device is held together as a captive assembly by two cylinder pins 12 and 13. For this purpose, cylinder pins 12, 13 both are pressed into a central bore 14 through axle 7 and are also each pressed into a central bore 15 and 16 through the associated support disk 9 or, respectively, 10. Cylinder pin 13 at the internal combustion engine protrudes axially relative to support disk 10 and also has a centering function for the assembly, in that when the intermediate gear device is mounted on the internal combustion engine, cylinder pin 13 is placed into a corresponding central bore in the internal combustion engine. The fastening of the intermediate gear device to the internal combustion engine takes place using three screws (not shown) that, in the assembled state, are screwed into screw bores 17, distributed around the circumference at intervals of 120°, through support disks 9, 10 and through axle 7, and into the internal combustion engine.

For the supply of lubricant to needle bearing 8, the intermediate gear device is connected to the lubricant circuit of the internal combustion engine. For this purpose, support disk 10 lying against the internal combustion engine has, in addition to the three screw bores 17, three additional axial openings 18, also distributed around the circumference at intervals of 120° and situated symmetrically between screw bores 17. Independent of the angle of installation of the intermediate gear device on the internal combustion engine, which due to the three symmetrically situated screw bores 17 may be either 0°, 120°, or 240°, one of the axial openings 18 in support disk 10 always communicates with a lubricant supply line that exits at the corresponding connecting surface of the internal combustion engine. The lubricant duct going from here and leading to needle bearing 8 is formed by stamped recesses on contact surfaces 19, facing the axle, of the two support disks 9, 10 formed as stamped plate parts. The end-face contact surfaces 20 of axle 7 are made flat in the present exemplary embodiment.

The recesses each comprise an annular duct 21 and 22, which in the case of support disk 9 communicates with the three screw bores 17 and which in the case of oppositely situated support disk 10 at the internal combustion engine communicates with the three screw bores 17 and the three axial openings 18 additionally present there. The part of the lubricant duct that axially connects the two annular ducts 21, 22 is formed by axial openings through axle 7 and, in the present case, through screw bores 17 thereof, whose diameter is larger than the screw shaft, running therein, of the above-named screws. Leakage at the end face of hydraulic medium from screw bores 17 of support disk 9 is prevented by the screw heads of the screws, which make contact with a sealing effect. In addition, the recesses also each comprise six ribs 23 and 24 that, distributed circumferentially, branch off radially outwardly from annular duct 21, 22 and that extend up to the running diameter of needle bearing 8, in order to form openings of the lubricant duct that open toward needle bearing 8 and to supply needle bearing 8 with essentially the same quantity of lubricant in axially symmetrical fashion.

The invention claimed is:

1. An intermediate gear device for a traction drive and/or spur gear drive of an internal combustion engine, the intermediate gear comprising an at least two-track construction with a drive gear and a driven gear, a flangeless axle, and a needle bearing by which the intermediate gear is radially mounted on the flangeless axle, two support disks on which the intermediate gear is axially supported at both sides thereof, and a duct that is adapted to be connected to a lubricant circuit of the internal combustion engine to supply lubricant to the needle bearing, the support disks contact the flangeless axle at both axial ends of the flangeless axle by respective contact surfaces of the support disks contacting adjacent contact surfaces of the flangeless axle at each of the axial ends, a mouth of the lubricant duct opens toward the needle bearing and is formed by one or more recesses on at least one of the contact surfaces on the support disks or the contact surfaces of the flangeless axle.

2. The intermediate gear device as recited in claim 1, wherein a supply of lubricant to the needle bearing is provided to both of the axial ends of the flangeless axle.

3. The intermediate gear device as recited in claim 1, wherein the recesses comprise an annular duct that communicates hydraulically with at least one axial opening and ribs distributed circumferentially, that branch radially outward from the annular duct.

4. The intermediate gear device as recited in claim 3, wherein the axial opening that extends through the flangeless axle is for a screw that is adapted to fasten the intermediate gear device to the internal combustion engine.

5. The intermediate gear device as recited in claim 1, wherein the recesses are stamped recesses formed without cutting.

* * * * *